April 26, 1966 W. E. BURNS 3,248,527

ELECTRONIC MULTIPLIER

Filed Dec. 28, 1962 7 Sheets-Sheet 1

INVENTOR.
WILLIAM E. BURNS
BY Otto Schmid, Jr.
AGENT

April 26, 1966 W. E. BURNS 3,248,527

ELECTRONIC MULTIPLIER

Filed Dec. 28, 1962 7 Sheets-Sheet 3

ELECTRONIC MULTIPLIER

Filed Dec. 28, 1962 7 Sheets-Sheet 7

3,248,527

ELECTRONIC MULTIPLIER

William E. Burns, Los Gatos, Calif., assignor to International Business Machines Corporation, New York, N.Y., a corporation of New York Filed Dec. 28, 1962, Ser. No. 248,062
9 Claims. (Cl. 235—164)

This invention relates to an electronic multiplication system and more particularly to an electronic multiplication system in which the product is obtained by successive addition.

In prior art serial by character data processing machines, it has been the practice to perform multiplication by over and over addition of the multiplicand or to add multiples of the multiplicand to form a product. Generally in the prior art method of summing by successive digits, all multiplicand digits are simultaneously summed in accordance with the value of the multiplier digits. The prior art method generally requires two references to storage for each unit value of multiplier digit for each digit of the multiplicand. In the apparatus of this invention only two references to storage are required for each multiplier digit for each digit of the multiplicand.

It is therefore an object of this invention to provide an improved serial by character electronic multiplier capable of operating at increased speeds.

Another object of the invention is to provide an electronic multiplier wherein a product is developed by summing the partial products of each multiplier digit times each multiplicand digit and including the carries developed as a factor of a subsequent partial product.

A further object of this invention is to provide an electronic multiplier wherein a product is generated by summing partial products, generated under control of a counting means, of each multiplier digit times each multiplicand digit and including carry digits as a factor of the partial product of another order of the product.

According to the invention, a novel electronic multiplying system is provided in which the product is derived by summing the partial products of each multiplier digit times each multiplicand digit along with the appropriate accumulated carry factors. Circuit means are provided to read a single digit of the multiplicand from the memory on a serial by character basis and set this value into a single digit multiplicand register. Circuit means are also provided to read a single digit of the multiplier out of storage and set this value into a multiplier counter. The normal machine cycle control circuitry is then interrupted and the multiplicand digit is gated through an accumulating means under control of the multiplier counter to add the digit to the amount contained in a single digit product register. The register also stores a single digit sum and a carry register is provided for accumulating the carries during the summing operation. The count standing in the multiplier counter is reduced by one for each addition and the additions are continued until the multiplier counter reaches zero. The normal machine cycle control circuitry is then reactivated and the multiplicand digit is regenerated in memory from the multiplicand register. Circuit means are provided to store the product digit in memory and to read out the next multiplicand digit. Recall means are provided to substantially instantly reset the multiplier counter to the multiplier digit value and circuit means are provided to transfer the accumulated carry value to the reset product register. The second digit of the multiplicand is then processed in the same manner with the accumulated carry from the previous partial product being included in the sum. This process is continued until each multiplicand digit is multiplied by the first multiplier digit. A similar procedure is encountered with each of the multiplier digits in turn with the accumulated carry being included in the sum of the particular order in accordance with the sum of the partial products.

The foregoing and other objects, features and advantages of the invention will be apparent from the following more particular description of preferred embodiments of the invention, as illustrated in the accompanying drawings.

Figure 1:
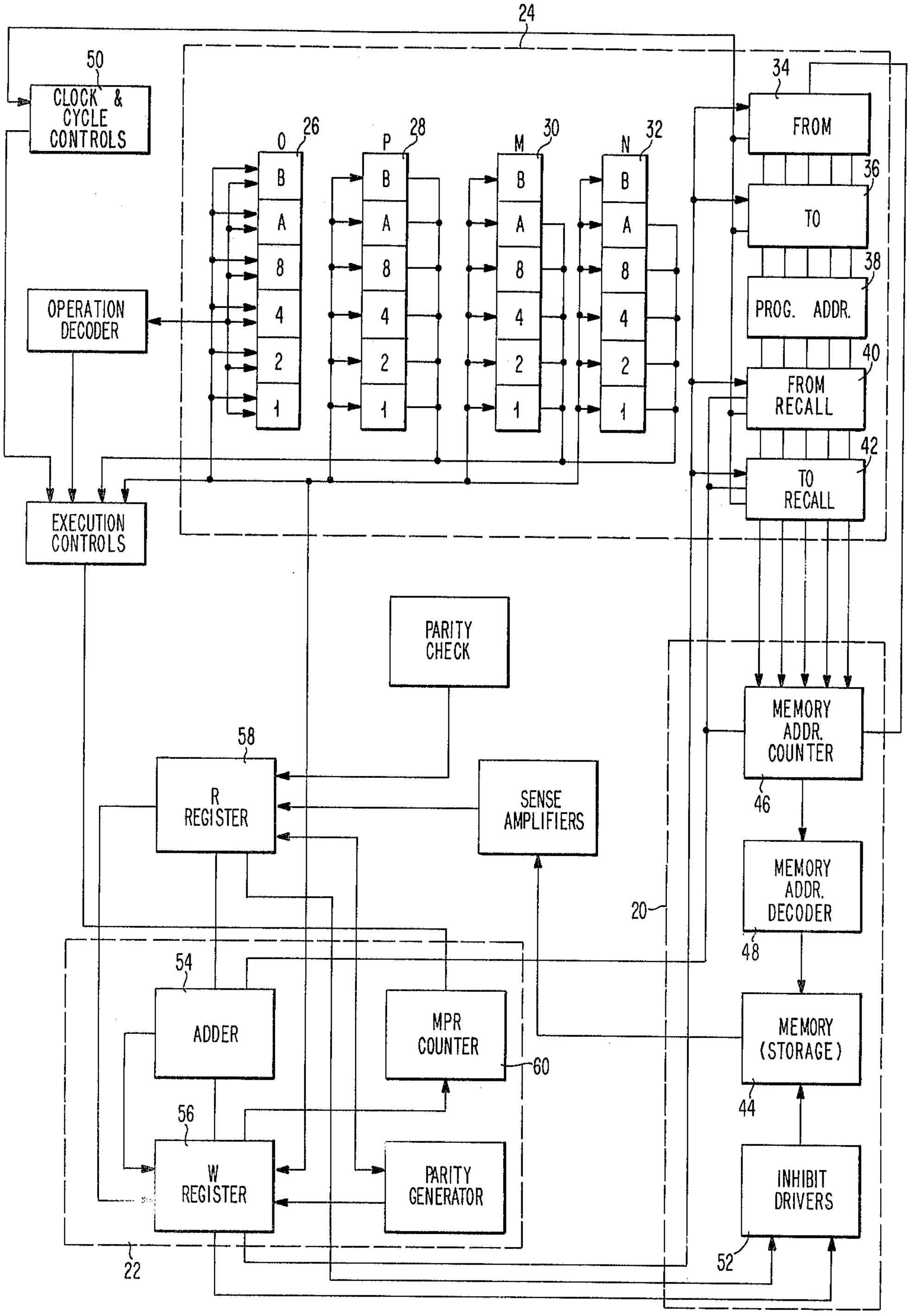
FIG. 1 shows a diagrammatic block diagram of a data processing machine embodying the invention.
Figure 2:
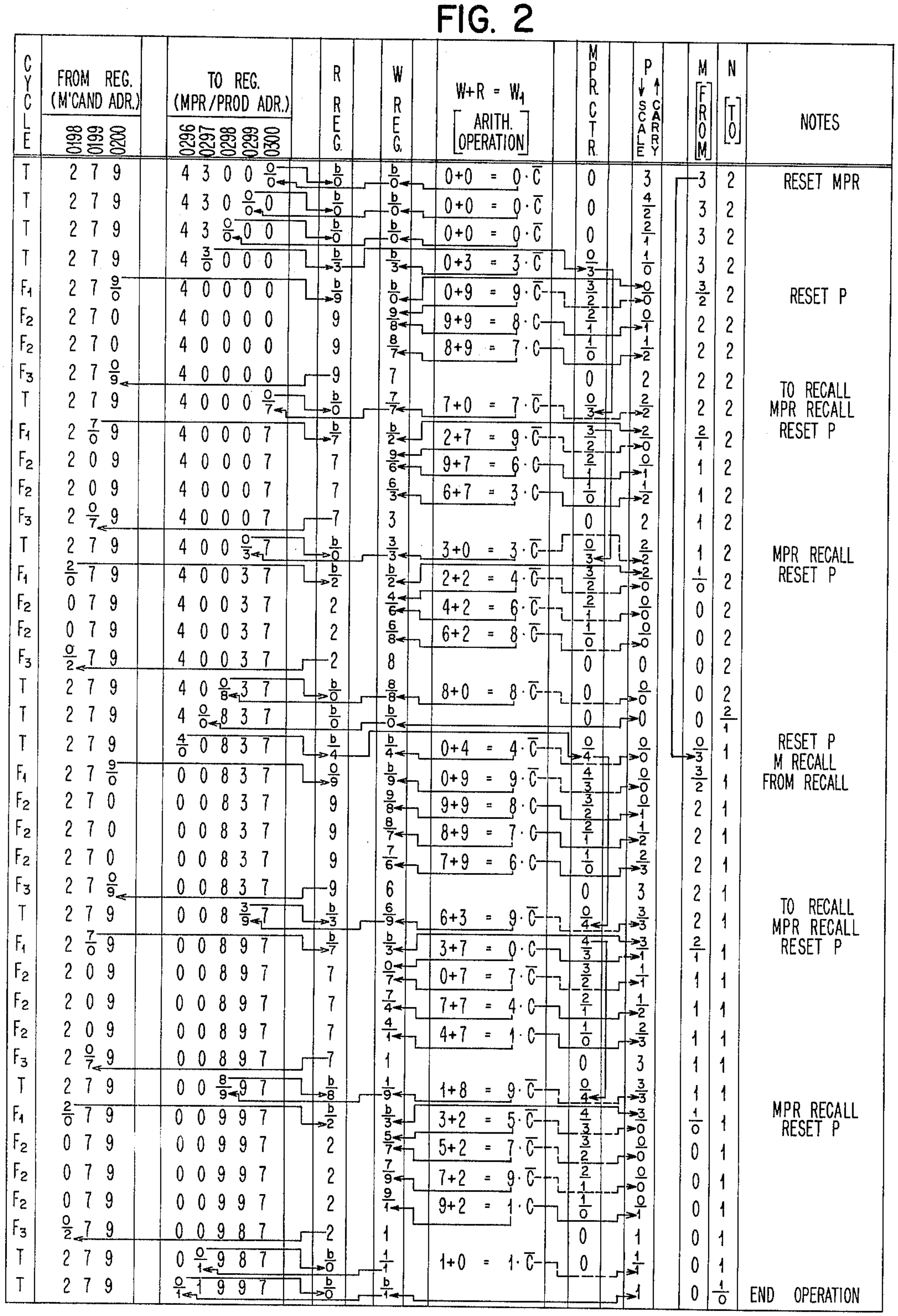
FIG. 2 shows a flow chart presentation of an example of the multiplication of two numbers according to the invention.

The data processing system basically comprises a storage section 20, an arithmetic section 22 and an instruction register section 24. A plurality of control registers 28–32 are provided to store the control part of the instruction and a plurality of address registers 34–42 are provided to store the address part of the instruction. The address registers are connected to read a particular character from the memory 44 by means of memory address counter 46 and the memory address decoder 48. For a multiply operation the operation register 26 sets the control to define the operation to be performed and register 28 stores a factor which identifies the first multiplier digit and this register also accumulates arithmetic carries during the multiply operation. The registers 30, 32 specify the length of the FROM (multiplicand) and TO (multiplier) fields respectively. The FROM address register 34 stores the address of the low order digit of the multiplicand in storage and the TO address register 36 contains the address in storage of the multiplier and also the address of the field wherein the product will be stored. The basic memory cycle of the machine is a character cycle which includes a read portion, a processing portion and a write portion. The clock and cycle control 50 are provided to cycle the machine between TO cycles in which the TO address register 36 addresses storage and FROM cycles in which the FROM address register 34 addresses storage. The operation being performed consists of various combinations of TO and FROM cycles depending upon the operation called for by the instruction word stored during the instruction load phase. Since data is processed on a serial by character fashion, the normal operating cycle is to read out the low order position of the stored address, perform the desired operation with the data and then to regenerate the data in storage by properly controlling the inhibit drivers 52 at the end of the cycle. While this operation is performed, the address control circuits cause the address to be decreased by 1 so that the next character of the field is addressed on the next cycle.

To illustrate the operation of the multiply system a sample problem will be presented wherein it is desired to multiply 279 by 43. It will be assumed that the multiplier is stored beginning in storage location 300 and the multiplicand field is located beginning at storage location 200. Provision must be made to provide a field length sufficient to store the product. The product storage location overlaps the field of the multiplier. A scaling factor equal to the number of digits in the multiplicand is part of the instruction and this factor is stored in register 28. Thus, starting at the address 300 the cycle controls will start with a TO cycle which will address storage location 300 and the memory address counter will be advanced through four successive storage locations under control of the scaling factor before the first digit of the multiplier is obtained. This operation is under control of the counter gating control circuit shown in FIGURE 3 which counts down one state after each TO cycle after the first count is suppressed. When the counter reaches zero, this signifies the location of the first multiplier digit and this digit is set in multiplier counter 60. Regeneration of this character in memory is suppressed so that storage location 297 will then be set to zero.

Figure 3:
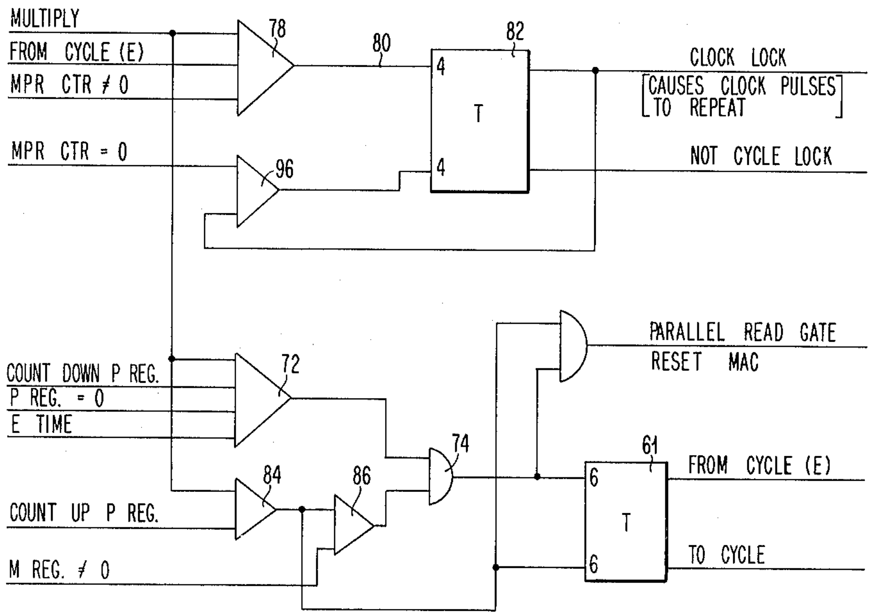
FIG. 3 shows a block diagram of a part of the clock and cycle control circuit.

The control then shifts to a FROM cycle and the character at address 200 is read from storage and transferred to the accumulating means. The accumulating means comprises an R register 58, an adder 54, and a W register 56. The registers are initially reset to zero, the digit 9 is read out into register 58 and gated through the adder 54. This is equivalent to adding a 9 to the factor contained in register 56 (zero) and forming the sum 9 which is placed in the W register 56. The multiplier counter 60 counts down from 3 to 2 and, since the clock pulse sequence is altered by the control circuit shown in FIG. 3 repeat the same clock pulse that generates the sums in the W register, the 9 in register 58 is again added to the contents of register 56 to form the sum 18. The 8 remains in the single character register 56 and register 28, which is used to accumulate carry signals, is counted up from zero to 1. Since the multiplier counter is not zero, the altered clock pulse sequence continues and the process is repeated. This forms the sum 9+8 and the 7 remains in register 56 while the carry causes register 28 to count up from 1 to 2. Since the multiplier counter 60 will be counted to zero by this addition, the normal clock pulse sequence is resumed (FIG. 3).

Hence, in the end part of the cycle, the multiplicand digit 9 will be regenerated into storage location 200 from register 58, the sum 7 remains in register 56 and the accumulated carry 2 remains in register 28. The M register 30, which keeps account of multiplicand digits used, has been counted down under control of circuitry shown in FIG. 5 from 3 to 2 and the FROM address has been advanced from 200 to 199 to the next digit of the multiplicand while this process was performed by the normal machine control circuitry. A suitable signal is impressed upon the triggers of the multiplier counter which causes the multiplier digit 3 to be recalled into the multiplier counter 60 on the following TO cycle. This prepares the multiplier counter for the summing sequence that will occur on the next multiplicand digit on the next FROM cycle. The machine controls (FIG. 3) then shift to a TO cycle.

Means are provided (FIG. 9) through use of the TO recall register 42 to read out, for the second time, the initial address (300) of the multiplier-product field. The digit at 300, 0, is added to the contents (7) of register 56 through register 58 and adder 54, and the sum 7 in register 56 is written into storage at the address 300 replacing the zero. Both the TO and the TO recall addresses are counted down from 300 to 299 and stored in registers 36, 42 respectively under control of the circuitry of FIG. 8. This permits the partial product sums to precess one position to the left for each multiplier digit used. This accomplishes the multiplication of the multiplicand by ten and thus secures a proper alignment for each multiplier digit automatically. Control shifts back to a FROM cycle and the carry, 2, stored in register 28 is transferred directly to register 56 early in the cycle and register 28 is reset to zero. On this FROM cycle the contents of the storage address 199 is read into register 58 and added by adder 54 to the contents of register 58 to form the sum 9. The same process is repeated as described on the previous FROM cycle except that the summing factor is now a 7 (from register 58) instead of a 9. The net result of summing the 7 three times (for the multiplier digit 3) and the previous carry is 23 so that a carry of 2 is stored in register 28 and the 3 remains in register 56. The register 30 is counted down from 2 to 1. Control again shifts to a TO cycle where the multiplier counter is again reset to 3, the value of the multiplier digit, and the sum 3 from register 56 is added to the contents of storage location 299 (0) and this sum 3 is written in storage at location 299.

On the next FROM cycle the next order multiplicand digit, 2, stored at storage location 198 is read out from storage to register 56. By the same process as previously described, the result of summing the multiplicand digit 2 three times (for the multiplier digit 3) and the previous carry of 2 forms as a result of 8 in register 56. At this time register 30 will count down from one to zero and this event means that all the multiplicand digits have now been multiplied by the multiplier digit 3. The next TO cycle will cause the sum of 8 from register 56 to be added to the contents (0) of storage location 298 and to write the result 8 into storage location 298. Another TO cycle then occurs and the contents of storage location 297 (0) is transferred to register 58. The carry factor (0) in register 28 is then added to this factor and stored in location 297. The N register 32 which keeps account of the multiplier digits used then counts from 2 to 1 and the memory address counter is advanced to 296. A third successive TO cycle is forced (FIG. 3) and the next multiplier digit, 4, is read into register 58 and also set into the multiplier counter 60. This TO cycle also conditions the FROM Recall Address Register 40 to transfer the original multiplicand field address into the Memory Address Counter 46 so that the address 200 is placed in the Memory Address Counter.

The process previously described is repeated wherein the first multiplicand digit, 9, is summed 4 times (multiplier digit of 4) with the result that a 6 is in register 56 and an accumulated carry of 3 is in register 28. On the following TO cycle the address obtained from register 42 is 299 and the controls cause the 3, which had been stored there, to be added to the 6 in register 56 to form a nine which is then stored at location 299 in storage. The memory address counter is advanced to 298 and this count is stored in both register 36 and register 42. The remaining cycles with this multiplier digit follow the same operation as described above. At the end of this cycle register 32 will have counted from 1 to 0 and the fact that both registers 30, 32 are zero signals the end of the operation and the remaining carry factor is then added to the contents of storage location 296 so that a complete product is formed.

Figure 5:
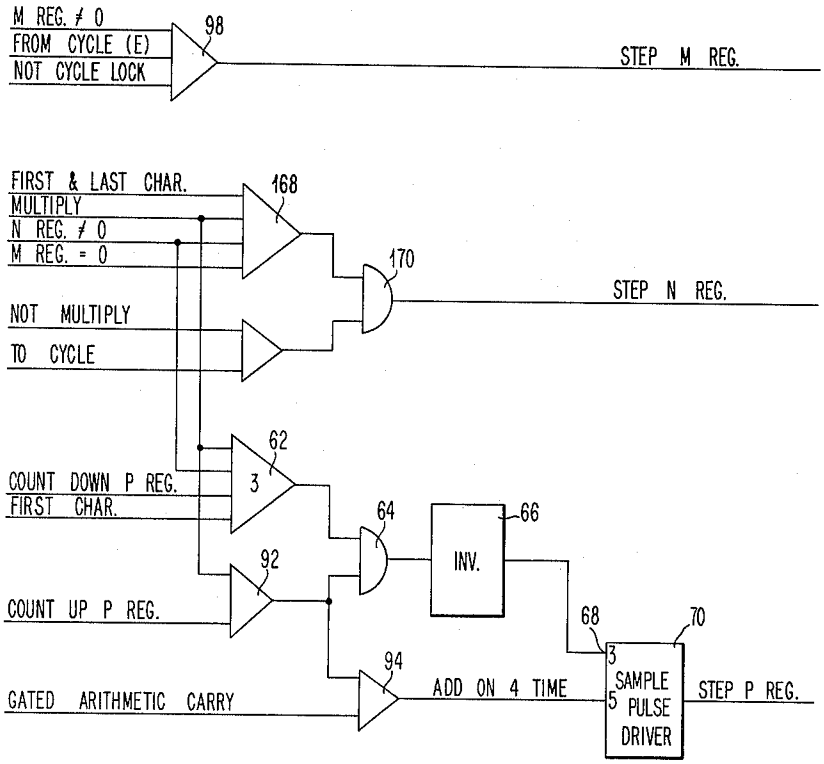
FIG. 5 shows a block diagram of the multiply counter gating control circuit.
Figure 13:
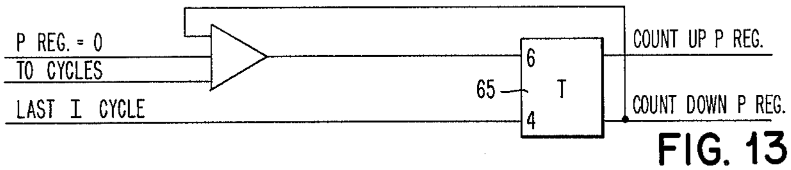
FIG. 13 shows a block diagram of the counting control circuit for the P register.
Figure 14:
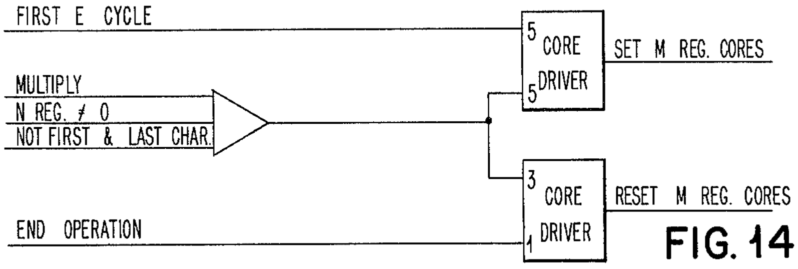
FIG. 14 shows a block diagram of the M register core driver control circuit.

In the embodiment of the invention shown, memory 44 comprises a magnetic core memory system and the basic machine cycle comprises six clock pulses which serve as controls to time the various operations within the machine cycle. Controls are built into the data processing machine for setting addresses into the address registers on the first clock pulse, performing a read operation on the second clock pulse, for stepping control registers 28 (for scaling) register 30 and the memory address counter on the third clock pulse, for adding on the fourth clock pulse, for stepping the carry accumulating counter 28 on the fifth clock pulse, and for writing data into memory on the sixth clock pulse. A multiply operation is begun by starting at the address 300 in the TO address register. The cycle control, FIGURE 3, will advance the memory address counter 46 by means of the cycle control trigger 61 which is reset to the TO cycle position prior to the execution of a multiply instruction by means not shown. The P register 28 acts initially as a counter to determine the position of the first multiplier digit in the TO address field, which is also used to store the product. A scaling factor equal to the number of digits in the multiplicand is set in register 28 during the instruction loading phase by means not shown. On the first TO cycle the STEP P REG signal is suppressed since AND circuit 62, FIG. 5, is conditioned due to line FIRST CHAR being up. However, on the second TO cycle, AND circuit 62 is not conditioned, which will produce an output pulse which is coupled through OR circuit 64, and inverter 66 to the input 68 of sample pulse driver 70 which then produces the output STEP P REG. By this means and trigger 65, FIG. 13, the P register 28 is counted down one state after each TO cycle. Thus, when the location 297 in the TO address field is addressed, the P register will be down to zero and this signals the location of the first multiplier digit, 3. The first multiplier digit, 3, is loaded into multiplier counter 60 and the first multiplicand digit is summed in the accumulating means under control of the multiplier counter.

The accumulating means comprises an R register 58, an adder 54, and a W register 56. One suitable accumulating means is described in the U.S. patent application of Leonard R. Harper, Serial Number 105,411, filed April 25, 1961. The R register 58 is a one character register consisting of a plurality of triggers and associated gating controls that accepts or holds data read from memory. The adder 54 is a switching network which forms the algebraic sum of the digits contained in the R registers 58 and the W register 56. The W register 56 is a one character register comprising a plurality of triggers and associated gating controls that can accept data from other registers or from the adder. Data can be written back into memory from both of the registers 56, 58. The registers are reset to zero and the digit, 9, is read out into register 58 and gated through the adder 54.

Figure 7:
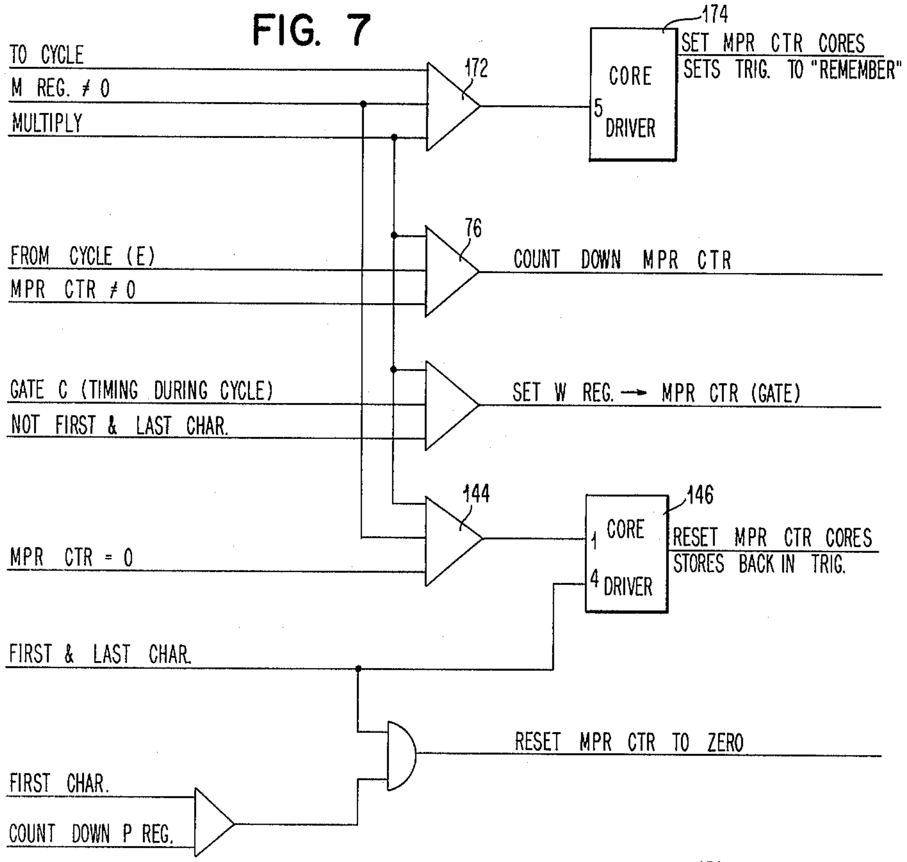
FIG. 7 shows a block diagram of the multiplier counter control circuits.

When the P register count equals zero, trigger 65 is set to produce the output COUNT UP P REG and this signal conditions AND circuit 72, which produces an output which is coupled through OR circuit 74 to set trigger 61. This action generates the signal FROM CYCLE so that control then goes to a FROM cycle and the character at the address 200 of the FROM address is read from storage to register 58 and gated through the adder to the W register 56, which has been previously reset. This is equivalent to adding a 9 to the previous contents of register 56 (zero) and thereby forming the sum 9 which is stored in register 56. The multiplier counter counts down from 3 to 2 by means of the circuitry shown in FIG. 7 since AND circuit 76 is conditioned to generate the signal COUNT DOWN MPR CTR. During this same operation AND circuit 98 (FIG. 5) is conditioned to generate the signal STEP M REG, which counts down M register 30 from 3 to 2 to keep track of multiplicand digits. The FROM address is counted down from 200 to 199 to the address of the next digit of the multiplicand and retained for future use.

Since the multiplier counter is not zero, the normal clock pulse sequence is altered to repeat the same clock pulse that generates sums in register 56. This control is accomplished by AND circuit 78 which is conditioned to produce an output on line 80 which causes trigger 82 to be set to the output wherein the signal CYCLE LOCK is generated. The CYCLE LOCK signal causes clock pulses 4 and 5 to repeat so that the 9 in the register 58 is again added to the contents of register 56 to form the sum 18. The 8 remains in the single character register 56 and the carry signal causes the signal STEP P REG to be generated. This signal causes the P register 28 to count up from zero to one and also conditions AND circuit 84 whose output is coupled through AND circuit 86 and OR circuit 74 to keep the machine in a FROM cycle. The P register was reset to zero by the signal CLEAR ACCUMULATED CARRY shown in FIGURE 6 when the control transferred to a FROM cycle since AND circuit 88 was then conditioned and the resulting output was coupled through OR circuit 90 to produce the signal CLEAR ACCUMULATED CARRY. The counting up of register 28 is controlled by AND circuit 92 whose output conditions AND circuit 94 since the GATES ARITHMETIC CARRY signal is present, so that register 28 is counted up.

The multiplier counter 60 counts down again from 2 to 1 but, since it is not zero, the altered clock pulse sequence continues and the process is repeated. This operation forms the sum 9+8=17. The 7 remains in register 56 and the carry causes register 28 to count up from 1 to 2. On this cycle the multiplier counter 60 is counted from one to zero so that AND circuit 96 is conditioned and the output is coupled to trigger 82 which then generates the signal NOT CYCLE LOCK and the normal clock pulse sequence resumes. In the end part of the interrupted FROM cycle the multiplicand digit 9 from register 58 is regenerated into storage. The sum 7 remains in register 56 and the accumulated carry of 2 is in register 28.

Figure 11:
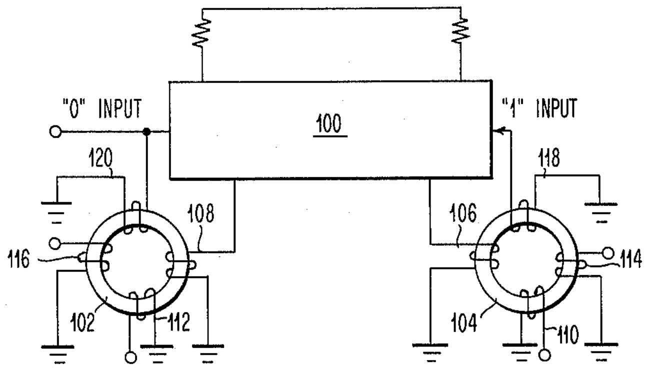
FIG. 11 shows schematic block diagram of the triggers comprising certain control registers and the multiplier counter.

The triggers comprising registers 28, 30 and multiplier counter 60 are adapted to store the condition of the trigger at a desired time and subsequently reset the trigger to the remembered condition upon the application of a RECALL signal. Referring to FIG. 11 these triggers comprise a conventional bistable trigger circuit 100 and a pair of memory cores 102, 104. Trigger 100 has two stable states, a "1" condition corresponding to conduction through winding 106 on memory core 104, and a "0" condition corresponding to conduction through winding 108 on memory core 102. Current flows through winding 106 when the trigger is in the "1" state and acts to half-select memory core 104. Similarly, current flows through winding 108 when the trigger is in the "0" state and acts to half-select memory core 102.

At the time it is desired to store the trigger condition windings 110 and 112 are energized to half-select memory cores 104 and 102. Depending on the state of the trigger at this time, a coincidence of half-select currents takes place to flip either memory core 104 or 102. Should the trigger be in "1" state, the half-select currents through windings 106 and 110 combine to flip memory core 104. Memory core 102 remains unchanged since no current is flowing in winding 108, and the half-select current through winding 112 is insufficient, by itself, to flip the core. Thus, memory core 104 is changed from negative to positive saturation to represent a "1" condition at the time of storage. Subsequent to storing, the trigger may be changed from one state to another without loss of the information stored in the memory core.

When it is desired to restore the trigger to the remembered condition, a pulse is applied to reset windings 114 and 116. The magnitude of this pulse is such that memory cores 104 and 102 are driven to negative saturation. Assuming that a "1" had been stored by driving memory core 104 to positive saturation, the change of flux caused by reset winding 114 induces a pulse in output winding 118. Since memory core 102 was already at negative saturation, there is no change of flux in this core and, therefore, no voltage induced across winding 120.

Windings 118 and 120 are connected to the "1" and "0" trigger outputs, respectively. Therefore, if the trigger is in the "0" condition, a pulse across winding 118 operates to change the trigger to the "1" state. If the trigger is in the "1" condition, if remains unchanged by the pulse across winding 118. In either case, the trigger is restored to the condition which was desired to be remembered.

A suitable signal is impressed on the core drivers which are coupled to the memory cores of the triggers comprising the multiplier counter at the end of the interrupted FROM cycle, which will cause them to recall the first multiplier digit 3 on the following TO cycle. This control is accomplished by AND circuit 144, FIG. 7, which produces an output when the multiplier counter reaches zero since the M register is not zero and the MULTIPLY line is up. This output is coupled to sample pulse driver 146 which produces the output RESET MPR CTR CORES, and this output is applied to the windings 114, 116 of the memory core of the memory core of the triggers comprising the multiplier counter. This operation recalls the original multiplier digit into the multiplier counter without an additional memory cycle to read out the digit from storage, and thus the multiplier counter is prepared for the summing sequence that occurs on the next FROM cycle.

Figure 4:
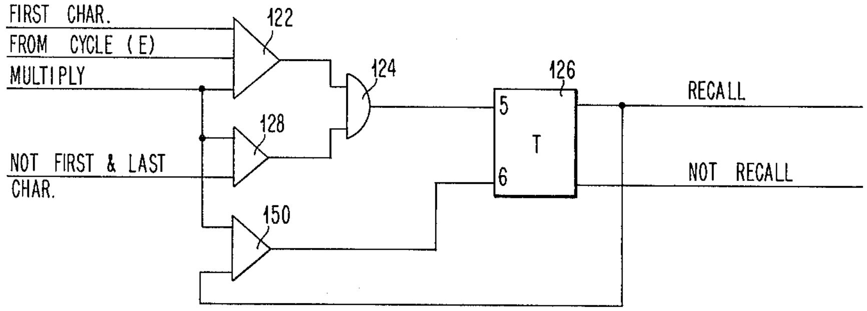
FIG. 4 shows a block diagram of the recall control circuit.
Figure 12:
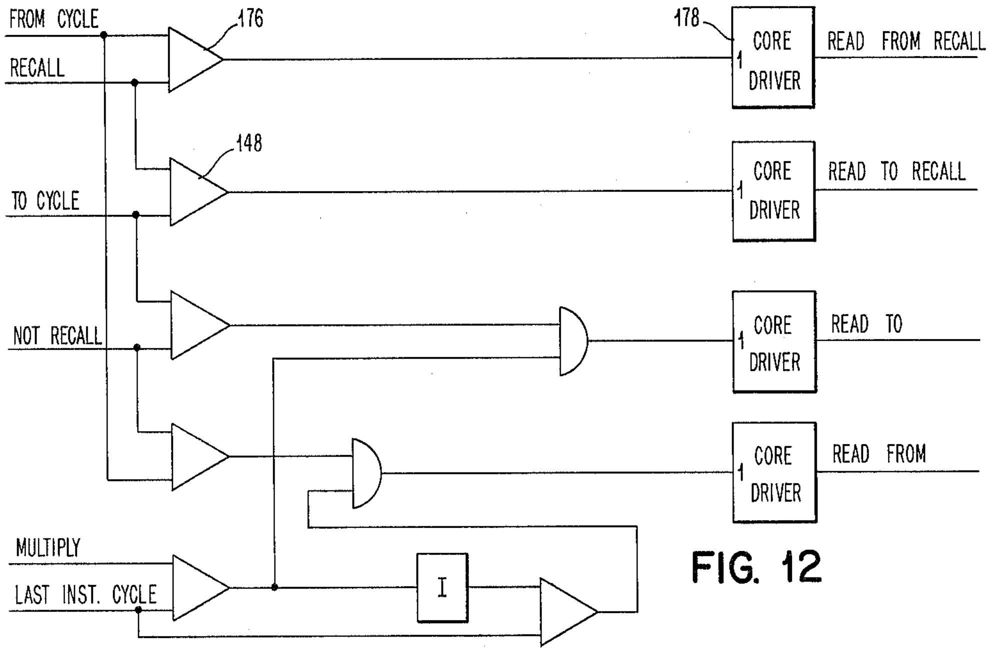
FIG. 12 shows a block diagram of the memory address control circuits for reading.

When control shifts to the TO cycle, means (FIG. 12) are provided through use of the TO RECALL Address Register 42 to read out for the second time the initial address of the multiplier-product field. This control is accomplished by AND circuit 148 which is conditioned by the signals RECALL and TO CYCLE. The RECALL signal is generated (FIG. 4) at the 5 pulse time of the FROM cycle through AND circuit 122, OR circuit 124, and trigger 126. Trigger 126 is set to produce the output NOT RECALL when AND circuit 150 is conditioned at the six pulse time of the cycle. AND circuit 150 is conditioned by coincidence between the RECALL signal and the MULTIPLY. However, the circuit has sufficient delay to prevent trigger 126 from being reset on the six pulse following the time the trigger is set so that the trigger produces the output RECALL until the six pulse of the following TO cycle. The digit at the multiplier-product field address 300 (zero) is added to the contents (7) of register 56 by means of register 58 and adder 54. A carry, if generated, would again cause register 28 to count up one more time. The sum 7 then in register 56 is written into storage at the multiplier-product field address 300 replacing the zero.

Figure 6:
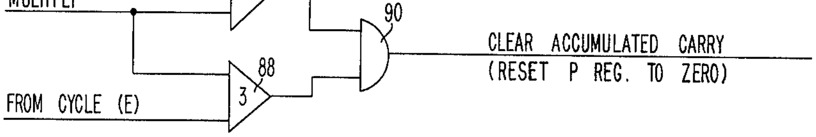
FIG. 6 shows a block diagram of a control circuit for resetting the carry register to zero.
Figure 10:
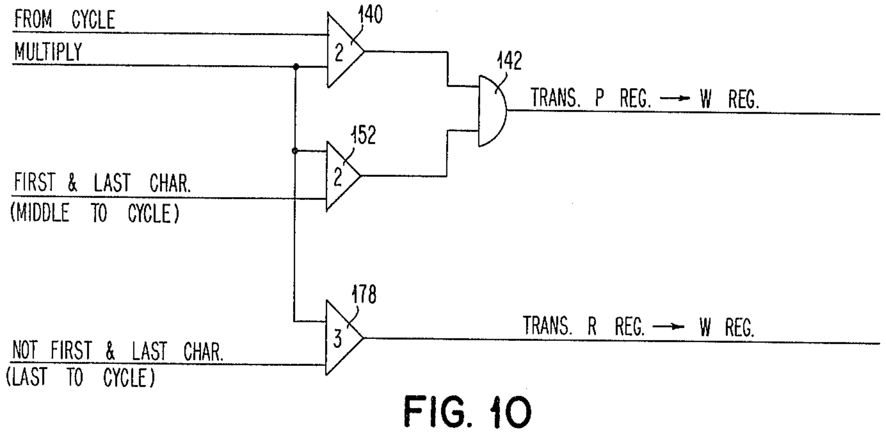
FIG. 10 shows a block diagram of the register gating control circuit.

Both the TO and TO Recall Addresses are counted down from 300 to 299 and then simultaneously stored in both TO and TO Recall registers 36, 42 since core drivers 130, 132 will be energized to generate the signals WRITE TO RECALL and WRITE TO respectively. AND circuit 128 is conditioned to control core driver 130 and to control core driver 132 through OR circuit 134. The counting of the TO and TO Recall Address allows the partial product sums to precess one position to the left for each multiplier digit used. This accomplishes the multiplication of the multiplicand by 10 for each multiplier digit automatically. Control then shifts back to a FROM cycle (FIG. 3) and the carry 2 stored in register 28 is transferred directly to the register 56 early in the cycle by the circuitry shown in FIGURE 10 wherein AND circuit 140 is conditioned to produce an output which is coupled through OR circuit 142 to generate the signal TRANS P REG TO W REG. The P register 28 is reset to zero by the signal CLEAR ACCUMULATED CARRY (FIG. 6). On this FROM cycle the contents of the storage address 199 is read into register 58 and coupled through the adder 54 to form the sum 7+2=9 which is stored in register 56.

The same process is repeated, as described on the previous FROM cycle, except that the next multiplicand digit, 7, is the summing factor and this digit is summed under control of the multiplier counter until the count reaches zero. The net result of this partial product is a 3 in register 56 and a 2 in register 28, since the sum of the three 7's plus the 2 carry is 23. The 7 is regenerated in storage from register 58 at address 199 and the M register which keeps track of the multiplicand digit being processed is counted from 2 to 1 (FIG. 5). Control then shifts to a TO cycle and the multiplier counter is again reset to 3. The cycle control circuits cause the contents (zero) of the addressed multiplier-product storage location, 299, to be set in register 58 and added to the sum, 3, which is in register 56, and the sum three is written at storage location 299. The TO address is changed to 298 by the normal machine controls and stored in the TO address register 36 by the circuitry of FIG. 8 since AND circuit 136 is deconditioned but inverter 138 converts this output to an up level which is coupled through OR circuit 134 to energize core driver 132 to produce the output WRITE TO. Note that the TO Recall Address register 42 still contains the address 299.

On the next FROM cycle the next multiplicand digit 2, at storage location 198, is transferred to register 58. By the same process previously described, the multiplicand digit 2 is summed under control of the multiplier counter until the multiplier counter reaches zero, and the final summation of the 2 three times plus the carry of two is 8 which ends up in the W register. The multiplicand digit is regenerated in storage from register 58 and the FROM register address is modified to 197. At this time the M register 30 will count down to zero. This last event suppresses the recall circuit in the multiplier counter since AND circuit 144 is not conditioned and the core driver 146 does not generate the signal RESET MPR CTR CORES.

Figure 8:
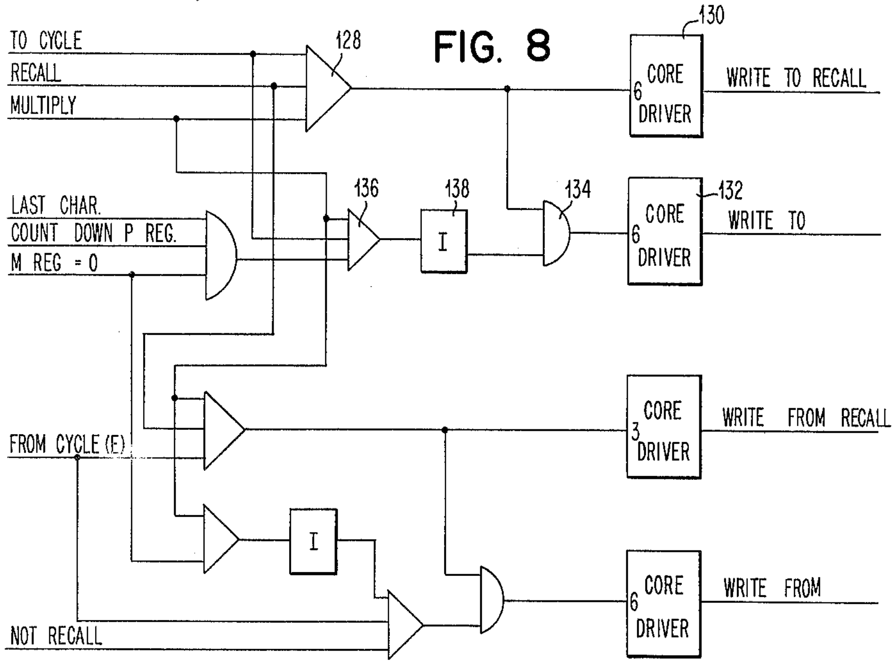
FIG. 8 shows a block diagram of the memory address control circuits for writing.
Figure 9:
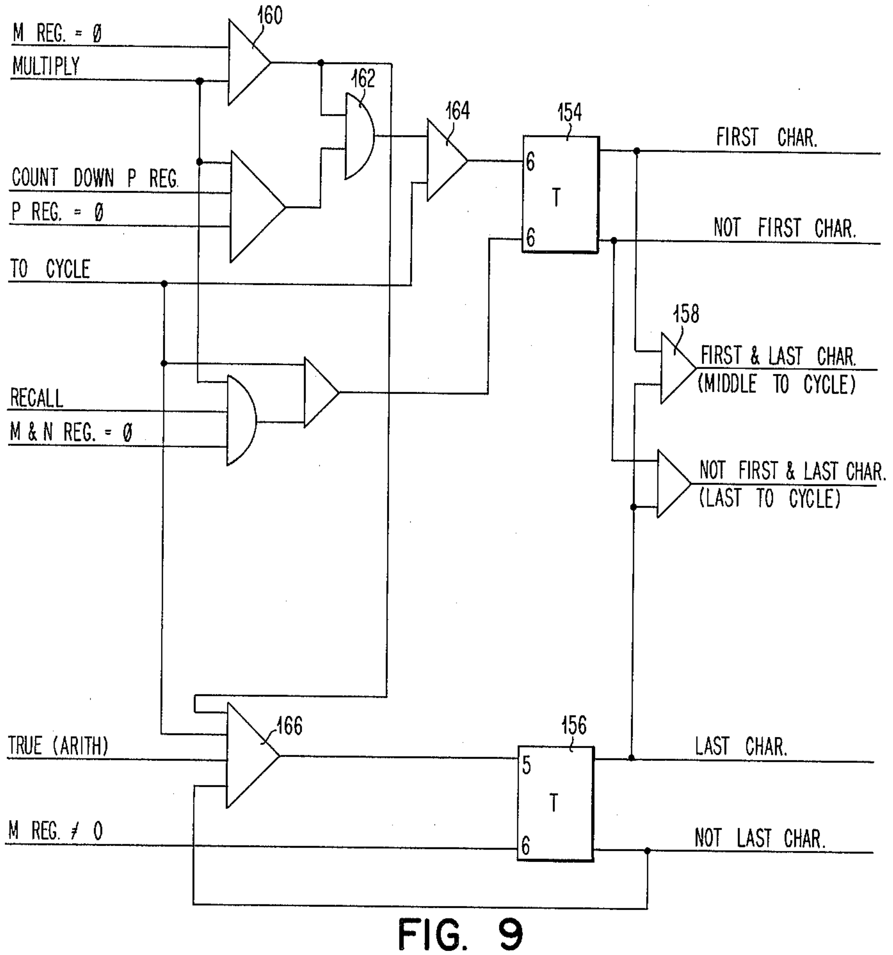
FIG. 9 shows a block diagram of the first and last character control circuit.

On the next TO cycle the contents (0) of the addressed position, 298, of the multiplier-product field is added to the contents, 8, of register 56, and the resulting sum, 8, is written into storage location 298. The fact that the M register and multiplier counter are both zero will force another TO cycle to occur (FIG. 3) and also prevent the contents of the memory address counter which had advanced from 298 to 297 from being stored in the TO address register (FIG. 8). On the next TO cycle the contents of storage location 297, 3, which was the first multiplier digit, is transferred to register 58. The M register and multiplier counter states, plus some additional cycle control circuits FIGS. 9, 10, cause the accumulated carry (0) in the P register to be transferred to the W register. The signal TRANS P REG TO W REG is generated when AND circuit 152 is conditioned and its output is coupled through OR circuit 142. AND circuit 152 is conditioned by the signal FIRST AND LAST CHAR which is generated by coincidence of an output of two triggers 154, 156 in AND circuit 158. Trigger 154 is set to generate the output FIRST CHAR by the output from AND circuit 160 which is coupled through OR circuit 162 and AND circuit 164. Trigger 156 is set to produce the output LAST CHAR by the output of AND circuit 166 which is conditioned by the signal NOT LAST CHAR, the output of AND circuit 160, the signal TRUE (ARITH) and the fact that the machine is in a TO cycle. The accumulated carry is zero for this particular case and the zero is written into storage location 297. The N register is counted down from 2 to 1 since AND circuit 168 is conditioned and this output is coupled through OR circuit 170 to produce the signal STEP N REG.

A third TO cycle is forced, since the controls (FIG. 3) are not conditioned to transfer to a FROM cycle. The memory address counter is advanced to 296 and the next multiplier digit 4 at storage location 296 is read into the R register 58. The third consecutive TO cycle identifies this character as the next multiplier digit, so it is transferred to the multiplier counter by means of the control circuitry shown in FIGURE 7 since AND circuit 172 is conditioned which energizes core driver 174 to produce the output SET MPR CTR CORES. It also causes the triggers in the M register to recall the initial digit 3. Finally, the third consecutive TO cycle control prevents the current TO address 296 from being stored in the TO address register (FIG. 8). At this time the M register is not zero so control will transfer back to a FROM cycle (FIG. 3). AND circuit 176 is conditioned and energizes core driver 178 to produce the output READ FROM RECALL which causes the From Recall Address Register contents (200) to be transferred to the memory address counter instead of the contents of the FROM address register. This address 200 is immediately replaced back in the FROM address recall register without being modified. This then cycles the calculator back to the initial conditions as far as the data stored in the field beginning at storage location 200 is concerned.

The previous process of generating partial products of the multiplier digit times each multiplicand digit under control of the multiplier counter repeats again with a multiplier digit of 4 instead of a 3. The result of the first partial product of summing the nine four times produces a sum digit of 6 in register 56 and an accumulated carry digit of 3 in register 28. Since the multiplier counter is then zero, control shifts to a TO cycle. This TO cycle is analogous to the previously described cycle and the address obtained from the TO Recall Address Register, which had been counted, is 299. This will cause the 3, which had been stored in location 299 from the result of summing using the first multiplier digit to be read out to the R register and to be added to the sum digit 6 to form the sum 6+3=9. This resulting sum is then stored at location 299 in storage. The memory address counter is advanced to 298 and this count is stored in both the TO and the TO Recall Address Registers. The remaining cycles with the multiplier digit 4 follow the same operation as previously described for the multiplier digit 3.

The result of summing the multiplicand digit seven four times and the previous carry of 3 is 31. The sum digit, one, is in register 56 and this factor is added to the 8 previously stored at location 298 on the next TO cycle to produce the sum 9 which is stored in location 298. The next partial product resulting from summing the multiplicand digit 2 four times and the previous carry of three under control of the multiplier counter is 11. The sum digit of one is added to the contents (0) of storage location 297 on the next TO cycle to form the sum of one and this digit is written in storage location 297. The fact that both the multiplier counter and M register 30 are both 0 forces another TO cycle to occur (FIG. 3) and the memory addresss counter counts down to 296. The carry digit, one, is then transferred (FIG. 10) from register 28 to register 56, added to the contents (0) stored at memory location 296, and the resulting sum is then stored in memory location 296. Finally, during this cycle, the N register 32 will have counted from one to zero and the fact that both register 32 and register 30 are zero signals the end of the operation. Thus the complete product 11,997 is then stored in the multiplier-product field.

While the invention has been particularly shown and described with reference to a preferred embodiment thereof, it will be understood by those skilled in the art that various changes in the form and details may be made therein without departing from the spirit and scope of the invention.

What is claimed is:

1. In a computer system for multiplication by over and over addition:
multiplier counter means,
means for entering a digit of the multiplier into said multiplier counter means,
accumulating means,
single digit multiplicand register means,
means under control of said multiplier counter connecting the output of said multiplicand register to said accumulating means whereby an operation by said accumulating means decreases the value in said multiplier counter and successive operations occur until the multiplier counter stands at zero,
carry register means,
means connecting said carry register to said accumulating means to accumulate carry signals therefrom,
means for generating a next partial product comprising the product of a multiplier digit times another multiplicand digit,
means for including the value in said carry register into said accumulating means as a factor of the next partial product,
means for including a previous partial product related to that order as a factor in said next partial product,
means for repeating the process of summing the partial products of each multiplier digit times each multiplicand digit,
means for shifting the position of partial products resulting from a succeeding multiplier digit one storage position, and means for summing all partial products of a related order of the product whereby a complete product is formed.

2. In a computer system for multplication by over and over addition:
multiplier counter means,
means for entering a digit of the multiplier into said multiplier counter means,
adding means,
single digit multiplicand register means,
means under control of said multiplier counter connecting the output of said multiplicand register to said adding means whereby an addition operation by said adding means decreases the value in said multiplier counter and successive additions occur until the multiplier counter means stands at zero,
carry register means,
means connecting said carry register to said adding means to accumulate carry signals therefrom,
means for loading a second digit of the multiplicand in said multiplicand register means,
means for recalling the multiplier digit in said multiplier counter,
means for generating a next partial product comprising the product of a multiplier digit times another multiplicand digit,
means for including the value in said carry register into said adding means as a factor of the next partial product,
means for including a previous partial product related to that order as a factor in said next partial product,
means for repeating the process of summing the partial products of each multiplier digit times each multiplicand digit,
means for shifting the position of partial products resulting from a succeeding multiplier digit one storage position, and means for summing all partial products of a related order of the product whereby a complete product is formed.

3. In a computer system for multiplication by over and over addition:
a data storage device having a plurality of addressable positions,
a multiplier storing section comprising one or more addressable positions storing a multiplier,
a multiplicand storing section comprising one or more addressable positions storing a multiplicand,
multiplier counter means,
means to initiate a multiply operation including means causing the transfer of a first multiplier digit from said multiplier storing section to said multiplier counter,
accumulating means,
a single digit multiplicand register means,
means for entering a digit of the multiplicand into said multiplicand register means,
machine cycle control means,
means for interrupting said machine cycle control means,
means under control of said multiplier counter for adding said multiplicand digit once each value of said multiplier digit while said interrupting means are operative,
means for decreasing the value in said multiplier counter for each addition,
means for sensing when said multiplier counter reaches zero,
means under control of said sensing means for returning control to said machine cycle control means,
carry register means,
means connecting said carry register to said adder means to accumulate carry signals therefrom,
means for generating a next partial product comprising the product of a multiplier digit times another multiplicand digit,
means for entering the value in said carry register into said accumulating means prior to the derivation of the next partial product,
means for including a previous partial product related to that order as a factor in said next partial product,
means for repeating the process of summing the partial products of each multiplier digit times each multiplicand digit,
means for shifting the position of partial products resulting from a succeeding multiplier digit one storage position, and means for summing all partial products of a related order of the product whereby a complete product is formed.

4. In a computer system for multiplication by over and over addition:
a data storage device having a plurality of addressable positions,
a multiplier storing section comprising one or more addressable positions storing a multiplier,
a multiplicand storing section comprising one or more addressable positions storing a multiplicand,
multiplier counter means,
means to initiate a multiply operation including means causing the transfer of a first multiplier digit from said multiplier storing section to said multiplier counter,
accumulating means,
a single digit multiplicand register means,
means for entering a digit of the multiplicand into said multiplicand register means,
machine cycle control means,
means for interrupting said machine cycle control means,
means under control of said multiplier counter for adding said multiplicand digit once each value of said multiplier digit while said interrupting means are operative to produce a sum digit,
means for decreasing the value in said multiplier counter for each addition,
means for sensing when said multiplier counter reaches zero,
means under control of said sensing means for returning control to said machine cycle control means,
carry register means,
means connecting said carry register to said adder means to accumulate carry signals therefrom,
means for storing said summed digit in said product storage location,
means for recalling the multiplier digit into said multiplier counter means,
means for entering the next order multiplicand digit in said multiplicand register means,
means for generating a next partial product comprising the product of a multiplier digit times another multiplicand digit,
means for entering the value in said carry register means into said accumulating means prior to the derivation of the next partial product,
means for including a previous partial product related to that order as a factor in said next partial product,
means for repeating the process of summing the partial products of each multiplier digit times each multiplicand digit,
means for shifting the position of partial products resulting from a succeeding multiplier digit one storage position, and means for summing all partial products of a related order of the product whereby a complete product is formed.

5. In a computer system for multiplication by over and over addition:
a data storage device having a plurality of addressable positions,
a multiplier storing section comprising one or more addressable positions storing a multiplier,
a multiplicand storing section comprising one or more addressable positions storing a multiplicand,
multiplier counter means,
means to initiate a multiply operation including means causing the transfer of a first multiplier digit from said multiplier storing section to said multiplier counter,
accumulating means,
a single digit multiplicand register means,
means for entering a digit of the multiplicand into said multiplicand register means,
machine cycle control means,
means for interrupting said machine cycle control means,
means under control of said multiplier counter for adding said multiplicand digit once each value of said multiplier digit while said interrupting means are operative to produce a sum digit,
means for decreasing the value in said multiplier counter for each addition,
means for sensing when said multiplier counter reaches zero,
carry register means,
means connecting said carry register to said adder means to accumulate carry signals therefrom,
means for storing said sum digit in said low order position of said multiplier storing section,
means under control of said sensing means for addressing the next highest order digit of the multiplicand storing section to enter said next order multiplicand digit in said multiplicand register,
means for recalling the multiplier digit in said multiplier counter,
means for generating a next partial product comprising the product of a multiplier digit times another multiplicand digit,
means for entering the value in said carry register into said accumulating means prior to the derivation of the next partial product,
means for including a previous partial product related to that order as a factor in said next partial product,
means for repeating the process of summing the partial products of each multiplier digit times each multiplicand digit,
means for shifting the position of partial products resulting from a succeeding multiplier digit one storage position, and means for summing all partial products of a related order of the product whereby a complete product is formed.

6. In a computer system for multiplication by over and over addition:

a data storage device having a plurality of addressable positions, a multiplier storing section comprising one or more addressable positions storing a multiplier having one or more digital orders, a multiplicand section comprising one or more addressable positions storing a multiplicand having one or more digital orders, adder means, multiplier counter means, means for causing transfer of a first order multiplier digit from said multiplier storing section to said multiplier counter, single digit multiplicand register means, means for causing transfer of a first order multiplicand digit from said multiplicand storing section to said multiplicand register, machine cycle control means, means to initiate a multiply operation including means to interrupt said machine cycle control means, means under control of said multiplier counter for successively summing the multiplicand digit and decreasing the value in said multiplier counter for each successive operation until the multiplier control stands at zero, means for sensing when said multiplier counter reaches zero, means under control of said sensing means for resuming said machine cycle control means, carry register means, means connecting said carry register to said adder means to accumulate carry signals therefrom, means for storing said sum digit in said low order position of said multiplier storing section, means for generating a next partial product comprising the product of a multiplier digit times another multiplicand digit, means for entering the value in said carry registers into said accumulating means prior to the derivation of the next partial product, means for recalling the multiplier digit value in said multiplier counter, means under control of said sensing means for causing transfer of the next order digit from said multiplicand storing section to said multiplicand register, means for including a previous partial product related to that order as a factor in said next partial product, means for repeating the process of summing the partial products of each multiplier digit times each multiplicand digit, means for shifting the position of partial products resulting from a succeeding multiplier digit one storage position, and means for summing all partial products of a related order of the product whereby a complete product is formed.

7. In a computer system for multiplication by over and over addition:

a data storage device having a plurality of addressable positions, a multiplier storing section comprising one or more addressable positions storing a multiplier having one or more digital orders, a multiplicand section comprising one or more addressable positions storing a multiplicand having one or more digital orders, multiplier counter means, means for causing transfer of a first order multiplier digit from said multiplier storing section to said multiplier counter, single digit multiplicand register means, means for causing transfer of a first order multiplicand digit from said multiplicand storing section to said multiplicand register, machine cycle control means, means to initiate a multiply operation including means to interrupt said machine cycle control means, summing means under control of said multiplier counter adapted to receive and add the multiplicand digit to form a partial product comprising an accumulated carry digit and a sum digit, means for stepping the multiplier counter down one for each operation by said adding means, means for sensing when said multiplier counter reaches zero, carry register means, means connecting said carry register to said adding means to store said accumulated carry digit therefrom, means for storing said sum digit in said multiplier storage section, means under control of said sensing means for causing transfer of a second order multiplicand digit from said mutliplicand storing section to said multiplicand register, means for generating a next partial product comprising the product of a multiplier digit times another multiplicand digit, means for entering the value in said carry register into said adding means prior to the derivation of the next partial product, means for including a previous partial product related to that order as a factor in said next partial product, means for repeating the process of summing the partial products of each multiplier digit times each multiplicand digit, means for shifting the position of partial products resulting from a succeeding multiplier digit one storage position, and means for summing all partial products of a related order of the product whereby a complete product is formed.

8. In a computer system for multiplication by over and over addition:

multiplier counter means, means for entering a digit of the multiplier into said multiplier counter means, adder means, single digit multiplicand register means, means under control of said multiplier counter connecting the output of said multiplicand register to said adder means whereby an addition operation by said adder means decreases the value in said multiplier counter and successive additions occur until the multiplier counter means stands at zero, carry register means, means connecting said carry register to said adder means to accumulate carry signals therefrom, means for loading a second digit of the multiplicand in said multiplicand register means, means for recalling the multiplier digit in said multiplier counter, means for generating a next partial product comprising the product of a multiplier digit times another multiplicand digit, means for entering the value in said carry register into said adder means prior to the derivation of the next partial product, means sensing when all digits of said multiplicand have been transferred, means under control of said sensing means for causing said transfer means to transfer another digit of said multiplier from said multiplier storage section to said multiplier counter, means for including a previous partial product related to that order as a factor in said next partial product, means for repeating the process of summing the partial products of each multiplier digit times each multiplicand digit, means for shifting the position of partial products resulting from a succeeding multiplier digit one storage position, and means for summing all partial products of a related order of the product whereby a complete product is formed.

9. In a computer system for multiplication by over and over addition:

multiplier counter means, means for entering a digit of the multiplier into said multiplier counter means, adding means, single digit multiplicand register means, means under control of said multiplier counter connecting the output of said multiplicand register to said adding means whereby an addition operation by said adding means decreases the value in said multiplier counter and successive additions occur until the multiplier counter means stands at zero, carry register means, means connecting said carry register to said adding means to accumulate carry signals therefrom, means for loading a second digit of the multiplicand in said multiplicand register means, means for recalling the multiplier digit in said multiplier counter, means for generating a next partial product comprising the product of a multiplier digit times another multiplicand digit, means for entering the value in said carry register into said adding means prior to the derivation of the next partial product, first means for sensing when all digits of said multiplicand have been transferred, means under control of said first sensing means for causing said transfer means to transfer another digit of said multiplier from said multiplier storage section to the multiplier counter, means for including a previous partial product related to that order as a factor in said next partial product, means sensing when all digits of said multiplier have been transferred, means for shifting the position of partial products resulting from a succeeding multiplier digit one storage position, and means for summing all partial products of a related order of the product whereby a complete product is formed.

References Cited by the Examiner

UNITED STATES PATENTS 3,157,779 11/1964 Cochrane ----------- 235—175

ROBERT C. BAILEY, *Primary Examiner.*

MALCOLM A. MORRISON, *Examiner.*